US012665001B2

(12) United States Patent
    Oohashi

(10) Patent No.: US 12,665,001 B2
(45) Date of Patent: Jun. 23, 2026

(54) RECORDING AND REPRODUCING DEVICE INCLUDING A PLURALITY OF RECORDING MEDIUMS

(71) Applicant: RESONAC HARD DISK CORPORATION, Ichihara (JP)

(72) Inventor: Fuminobu Oohashi, Tokyo (JP)

(73) Assignee: RESONAC HARD DISK CORPORATION, Ichihara (JP)

( * ) Notice: Subject to any disclaimer, the term of this patent is extended or adjusted under 35 U.S.C. 154(b) by 0 days.

(21) Appl. No.: 18/957,999

(22) Filed: Nov. 25, 2024

(65) Prior Publication Data

US 2025/0087245 A1    Mar. 13, 2025

Related U.S. Application Data

(62) Division of application No. 18/241,463, filed on Sep. 1, 2023, now abandoned.

(30) Foreign Application Priority Data

Sep. 6, 2022    (JP) ................................. 2022-141268

(51) Int. Cl.
    *G11B 33/08*        (2006.01)
(52) U.S. Cl.
    CPC .................................... *G11B 33/08* (2013.01)
(58) Field of Classification Search
    None
    See application file for complete search history.

(56) References Cited

U.S. PATENT DOCUMENTS

| | | | |
|---|---|---|---|
| 5,453,889 A | 9/1995 | Alt | |
| 6,212,029 B1 | 4/2001 | Fioravanti | |
| 6,226,145 B1 | 5/2001 | Genheimer | |
| 6,271,987 B1 | 8/2001 | Allsup | |
| 6,430,007 B1 | 8/2002 | Jabbari | |
| 6,477,000 B1 | 11/2002 | Pottebaum | |
| 2001/0001254 A1 | 5/2001 | Nagl | |
| 2001/0033459 A1 | 10/2001 | Boutaghou | |

(Continued)

FOREIGN PATENT DOCUMENTS

| | | |
|---|---|---|
| CN | 1253359 A | 5/2000 |
| JP | 11265553 A | 9/1999 |

(Continued)

*Primary Examiner* — William J Klimowicz
(74) *Attorney, Agent, or Firm* — Sughrue Mion, PLLC

(57)    ABSTRACT

A recording and reproducing device includes, a case; at least one recording medium having a disk-shape, a motor configured to rotate the at least one recording medium, a head configured to read or write information from or to the at least one recording medium, and an actuator configured to drive the head to scan in a radial direction of the at least one recording medium which are provided in the case; and a regulating portion configured to, when an external shock is applied to the at least one recording medium, contact an outer peripheral edge of the at least one recording medium to regulate displacements of the at least one recording medium due to bending of the at least one recording medium, wherein the regulating portion has a regulating member displaced between a position away from the outer peripheral edge of the at least one recording medium and a contact-possible position or a contacting position.

3 Claims, 6 Drawing Sheets

(56)  References Cited

U.S. PATENT DOCUMENTS

| | | | |
|---|---|---|---|
| 2002/0131212 A1* | 9/2002 | Yanagihara-shi ...... | G11B 21/22 |
| 2002/0171972 A1 | 11/2002 | Izumi | |
| 2004/0154035 A1* | 8/2004 | Aman ................ | G11B 19/2018 |
| 2006/0176608 A1 | 8/2006 | Xu | |
| 2007/0230038 A1 | 10/2007 | Eguchi | |
| 2009/0135515 A1 | 5/2009 | Satou | |
| 2009/0213499 A1 | 8/2009 | Yamamoto | |
| 2021/0272603 A1 | 9/2021 | Uehara | |
| 2022/0262397 A1 | 8/2022 | Kimura | |
| 2023/0368815 A1 | 11/2023 | Takano | |
| 2024/0079029 A1 | 3/2024 | Oohashi | |
| 2024/0079034 A1 | 3/2024 | Oohashi | |
| 2024/0135971 A1 | 4/2024 | Kitawaki | |

FOREIGN PATENT DOCUMENTS

| | | | |
|---|---|---|---|
| JP | 11-306729 A | 11/1999 | |
| JP | 2000-149493 A | 5/2000 | |
| JP | 2000-268485 A | 9/2000 | |
| JP | 2000-268531 A | 9/2000 | |
| JP | 2001-101814 A | 4/2001 | |
| JP | 2003-303485 A | 10/2003 | |
| JP | 2021-108234 A | 7/2021 | |
| KR | 20050122497 A | 12/2005 | |
| WO | 2011/121904 A1 | 10/2011 | |

* cited by examiner

RECORDING AND REPRODUCING DEVICE INCLUDING A PLURALITY OF RECORDING MEDIUMS

CROSS-REFERENCE TO RELATED APPLICATION

This is a Divisional of U.S. application Ser. No. 18/241,463 filed Sep. 1, 2023, which priority is claimed on Japanese Patent Application No. 2022-141268, filed Sep. 6, 2022, the content of which is incorporated herein by reference.

BACKGROUND OF THE INVENTION

Field of the Invention

The present invention relates to a recording and reproducing device.

Description of Related Art

A hard disk drive (HDD) is a recording and reproducing device capable of storing a large amount of information. Such a recording and reproducing device includes, within a case, a plurality of disks (disk-shaped recording media), a spindle motor that rotates the plurality of disks, heads attached to distal ends of a plurality of suspension arms, and a voice coil motor that drives the heads to scan in a radial direction of the disks, and writes (records) or reads (reproduces) information to or from the disks through the heads that scan the surfaces of the disks while rotating the disks.

Incidentally, for HDDs, attempts have been made to increase the number of disks that can be housed within a case in order to increase the storage capacity per one standardized HDD. Also, the distances between adjacent disks and the distances between the disks and other parts in HDDs have become narrower as the devices have become smaller.

On the other hand, the thicknesses of known 3.5-inch disks are about 1.27 mm. In this case, a standardized 3.5-inch HDD houses up to five disks within a case. Also, in recent HDDs, the thickness of each disk has been reduced and five or more disks have been housed within a case to increase the capacity.

However, when the thicknesses of disks are reduced, the rigidity of the disks decreases, such that they tend to bend when a strong external shock or vibration is applied to the HDD. In this case, contact between adjacent disks or contact between a disk and other parts increases the possibility of damaging the recording surfaces of the disks. Also, the recording density of recent recording medium is high and thus a large amount of recording capacity is lost even if a small portion of the recording surface is damaged.

Therefore, a regulating member which, when an external shock is applied to a recording medium, contacts an outer peripheral edge of the recording medium to regulate displacements of the recording medium due to bending of the recording medium is provided to solve such a problem (see, for example, Patent Documents 1 to 6 below).

PATENT DOCUMENTS

[Patent Document 1] Japanese Unexamined Patent Application, First Publication No. H11-306729
[Patent Document 2] PCT International Publication No. 2011/121904

[Patent Document 3] Japanese Unexamined Patent Application, First Publication No. 2000-149493
[Patent Document 4] Japanese Unexamined Patent Application, First Publication No. 2000-268531
[Patent Document 5] Japanese Unexamined Patent Application, First Publication No. 2001-101814
[Patent Document 6] Japanese Unexamined Patent Application, First Publication No. 2021-108234

SUMMARY OF THE INVENTION

Incidentally, in the configurations disclosed in the above-mentioned Patent Documents 1 to 6, a gap is provided between the recording medium and the regulating member so that the regulating member does not hinder rotation of the recording medium during operation in a stationary state. In addition, as long as the recording and reproducing device is an industrial product, since dispersion of dimensions and assembly positions of the recording medium and the regulating member is unavoidable, a gap between the recording medium and the regulating member is necessary to some extent.

However, in the above-mentioned configuration, when an external impact is applied to the recording and reproducing device, the recording medium vibrates for a while, during which it is not possible to start reading and writing on the recording medium.

The present invention has been proposed in view of such conventional circumstances and it is an object of the present invention to provide a recording and reproducing device that is restrained from hindering rotation of a recording medium in a stationary state and that can quickly attenuate vibrations generated in the recording medium in response to an external impact.

To achieve the above object, the present invention provides the following device.

(1) A recording and reproducing device including, within a case; at least one recording medium having a disk-shape, a motor configured to rotate the at least one recording medium, a head configured to read or write information from or to the at least one recording medium, and an actuator configured to drive the head to scan in a radial direction of the at least one recording medium which are provided in the case; and a regulating portion configured to, when an external shock is applied to the at least one recording medium, contact an outer peripheral edge of the at least one recording medium to regulate displacements of the at least one recording medium due to bending of the at least one recording medium,
  wherein the regulating portion has a regulating member displaced between a position away from the outer peripheral edge of the at least one recording medium and a contact-possible position or a contacting position.
(2) The recording and reproducing device according to (1) above, wherein the regulating portion is displaced to a position where the regulating member is able to come into contact with or comes into contact with the outer peripheral edge of the at least one recording medium when an external shock is applied to the at least one recording medium.
(3) The recording and reproducing device according to (1) above, wherein the regulating portion slides the regulating member in the radial direction of the at least one recording medium between a position away from the outer peripheral edge of the at least one recording medium and a contact-possible position or a contacting position.
(4) The recording and reproducing device according to t (3) above, wherein the regulating member is pivotally supported on a support shaft parallel to a rotation axis of the at least one recording medium, and rotates following the rotation of the at least one recording medium by coming into contact with the outer peripheral edge of the at least one recording medium.

(5) The recording and reproducing device according to (1) above, wherein the regulating member has a cam shape, a distance from a rotation center of which is changed between a position away from the outer peripheral edge of the at least one recording medium and a contact-possible position or a contacting position, and the regulating portion drives the regulating member to pivot around an axis parallel to a rotation axis of the at least one recording medium between a position away from the outer peripheral edge of the at least one recording medium and a contact-possible position or a contacting position.

(6) The recording and reproducing device according to (1) above, wherein the regulating member has a pair of contact surfaces facing the outer peripheral edge of the at least one recording medium, and the pair of contact surfaces are inclined in opposite directions with the outer peripheral edge of the at least one recording medium interposed therebetween.

(7) The recording and reproducing device according to (2) above, wherein the at least one recording medium includes a plurality of recording medium, the plurality of recording medium are arranged in an axial direction parallel to a rotation axis of the at least one recording medium, the pair of contact surfaces includes a plurality of pairs of contact surfaces, and each of the plurality of pairs of contact surfaces is arranged on the outer peripheral edge of the regulating member in the axial direction corresponding to each of the plurality of recording medium.

(8) The recording and reproducing device according to (1) above, wherein the regulating portion includes a plurality of regulating portions, and each of the plurality of regulating portions is provided at each of a plurality of positions in a circumferential direction of the at least one recording medium.

(9) The recording and reproducing device according to (1) above, wherein the at least one recording medium has a diameter of 90 mm or more and a thickness of 0.550 mm or less.

As described above, according to the present invention, it is possible to provide a recording and reproducing device that is restrained from hindering rotation of the recording medium in a stationary state and that can quickly attenuate vibrations generated in the recording medium in response to an external impact.

DETAILED DESCRIPTION OF THE INVENTION

Figure 1:
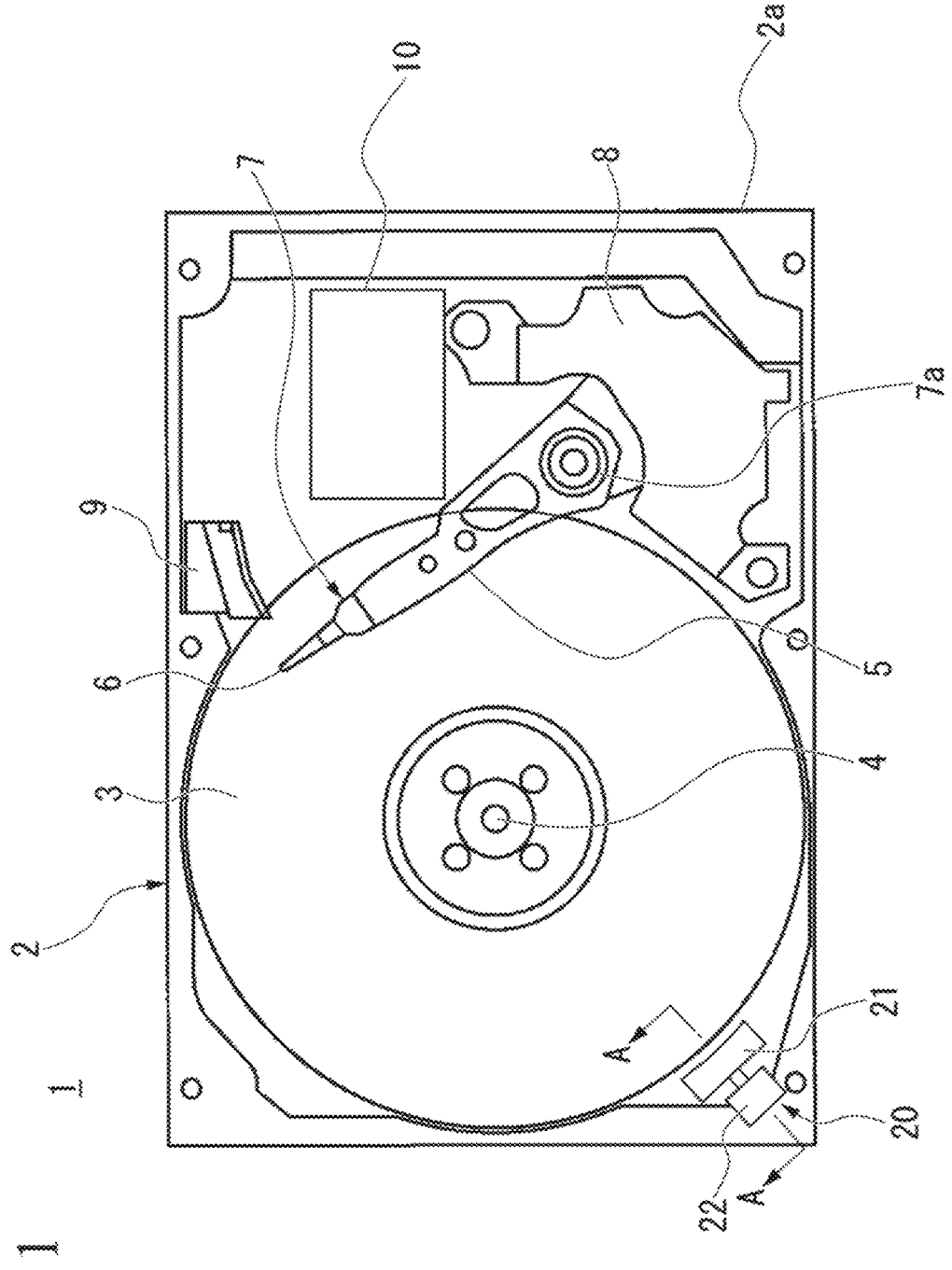
FIG. 1 is a plan view showing a configuration of a recording and reproducing device according to an embodiment of the present invention.

Hereinafter, embodiments of the present invention will be described in detail with reference to the drawings.

In the drawings used in the following description, to make features easy to understand, portions corresponding to the features are sometimes shown in an enlarged form for the sake of convenience and the dimensional ratios and the like of components are not always the same as the actual ones. Materials, dimensions, and the like exemplified in the following description are also examples, to which the present invention is not necessarily limited, and can be appropriately modified and implemented without departing from the spirit of the invention.

First, for example, a recording and reproducing device 1 shown in FIGS. 1 to 4 will be described as an embodiment of the present invention.

Figure 2:
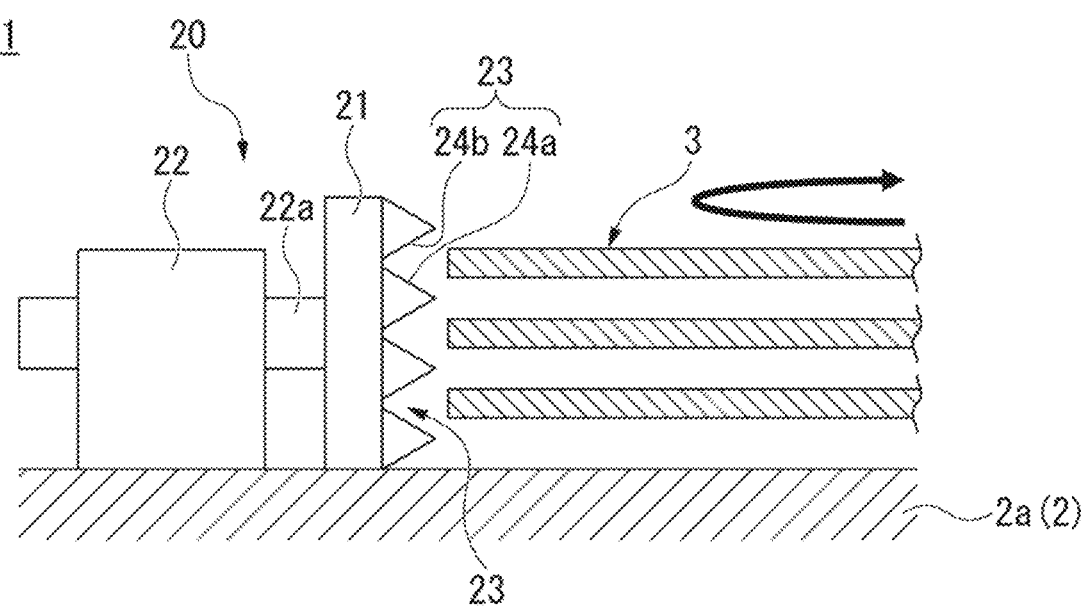
FIG. 2 is a cross-sectional view showing a configuration of a regulating portion taken along line A-A shown in FIG. 1 and showing a state in which a regulating member is separated from an outer peripheral edge of a disk.
Figure 3:
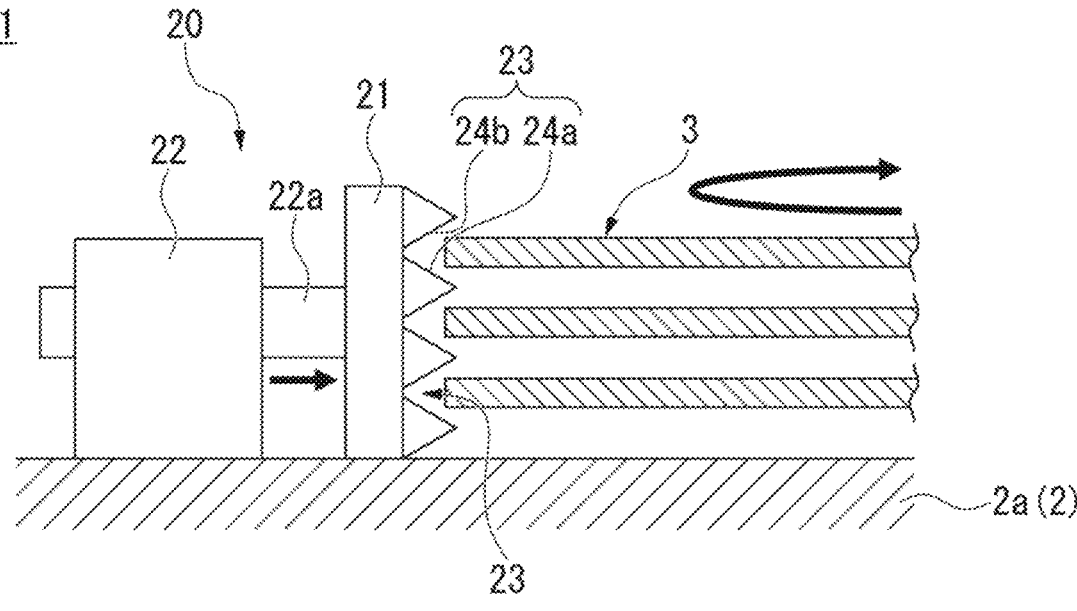
FIG. 3 is a cross-sectional view showing a state in which the regulating member is moved to a position where it can come into contact with the outer peripheral edge of the disk.
Figure 4:
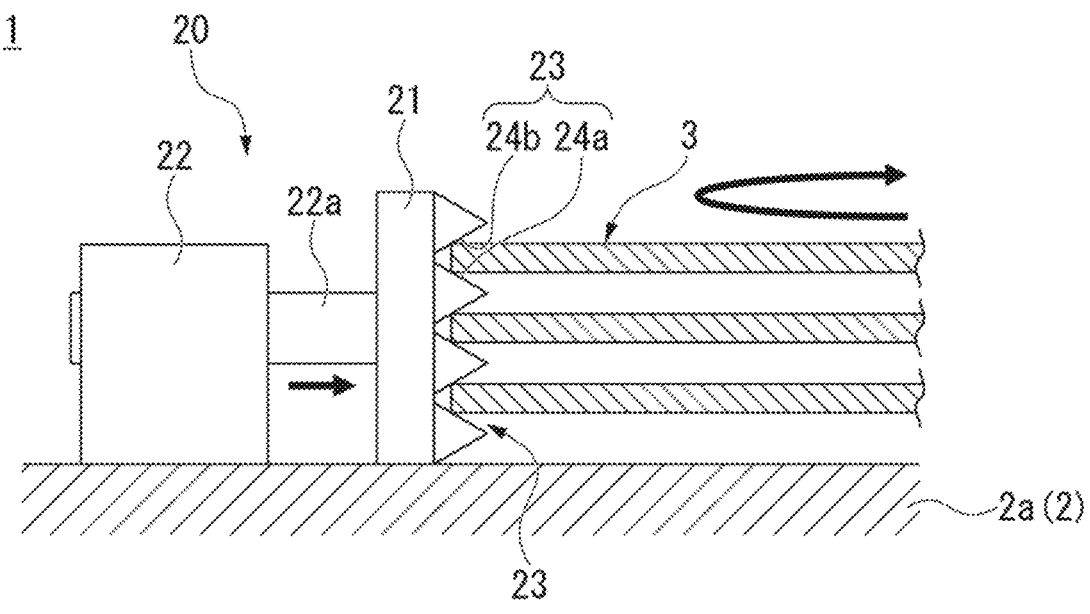
FIG. 4 is a cross-sectional view showing a state in which the regulating member is moved to a position where it comes into contact with the outer peripheral edge of the disk.

FIG. 1 is a plan view showing a configuration of the recording and reproducing device 1. FIG. 2 is a cross-sectional view showing a configuration of a regulating portion 20 taken along line A-A shown in FIG. 1 and showing a state in which a regulating member 21 is separated from an outer peripheral edge of a disk 3. FIG. 3 is a cross-sectional view showing a state in which the regulating member 21 is moved to a position where it can come into contact with the outer peripheral edge of the disk. FIG. 4 is a cross-sectional view showing a state in which the regulating member 21 is moved to a position where it comes into contact with the outer peripheral edge of the disks 3.

The recording and reproducing device 1 of the present embodiment is a device which applies the present invention to a hard disk drive (HDD) that magnetically stores information.

Specifically, as shown in FIGS. 1 and 2, the recording and reproducing device 1 includes a case 2; and a plurality of the disks 3, a spindle motor 4 that rotates the plurality of (three in the present embodiment) disks 3, head assemblies 7 in which each of heads 6 is attached to distal ends of each of a plurality of (six in the present embodiment) suspension arms 5, a head actuator 8 that drives the heads 6 to scan in a radial direction of the disks 3, a ramp 9 that allows the heads 6 to retract from surfaces of the disks 3, and a control unit 10 that controls the components are provided in the case 2.

The case 2 forms a space for housing the components inside when a lid (not shown) that closes a top opening of a case body 2a is attached to the case body 2a which is formed in the shape of a rectangular frame with a bottom.

Each disk 3 is a disk-shaped recording medium having a central hole and is attached to a rotation axis of the spindle motor 4. The disk 3 has a plurality of layers including a magnetic layer formed on each surface of a base material such as glass, aluminum, or aluminum alloy.

The plurality of disks 3 are provided arranged in an axial direction parallel to the rotation axis thereof at regular intervals. In addition, the plurality of disks 3 have the same outer shape in a plane view. The number of disks 3 is not limited to two or more and may be one.

The spindle motor 4 is a thin motor for HDDs and rotates the plurality of disks 3 integrally while holding the central holes of the plurality of disks 3 arranged in the axial direction.

The head assembly 7 is rotatably supported via a rotation shaft 7a provided on a base end side of the plurality of suspension arms 5 arranged in the axial direction.

The head actuator 8 is made of, for example, a voice coil motor, is provided on a base end side of the head assembly 7 across the rotation shaft 7a, and that rotates the head assembly 7. Thereby, the heads 6 attached to the distal ends of the suspension arms 5 can scan the disks 3 in the radial direction.

The ramp 9 is positioned radially outward of the disks 3 and forms a slope for retracting the heads 6 from the surfaces of the disks 3. Thereby, the heads 6 can be positioned on the ramp 9 when the disks 3 are stopped and can be positioned above the surfaces of the disks 3 when the disks 3 are rotating.

While controlling the driving of the spindle motor 4 and the head assembly 7, the control unit 10 performs control for processing information received from the outside and sending recording signals to the heads 6, processing reproduction signals from the heads 6 and sending information to the outside, and the like.

In the recording and reproducing device 1 configured as described above, the heads 6 scan the surfaces of the disks 3 while the disks 3 are rotating, thereby writing (recording) or reading (reproducing) information to or from the disks 3. In the recording and reproducing device 1, the each of heads 6 attached to the distal end of the each of suspension arms 5 scan both sides of the plurality of disks 3 arranged in the axial direction. Thereby, information is magnetically written (recorded) or read (reproduced) to or from both sides of each disk 3.

Incidentally, as shown in FIGS. 2, 3 and 4, the recording and reproducing device 1 of the present embodiment includes the regulating portion 20 that, when an external shock, vibration, or the like is applied to a disk 3, contacts an outer peripheral edge of the disk 3 to regulate displacements of the disk 3 due to bending of the disk 3.

The regulating portion 20 is provided at a position in the circumferential direction of the disks 3 where it can come into contact with and separate from the outer peripheral edges of the disks 3. In the present embodiment, the regulating portion 20 is provided inside the case body 2a at one corner thereof that faces the outer peripheral edges of the disks 3.

The regulating portion 20 has the regulating member 21 and a slide driving unit 22, and the slide driving unit 22 slides the regulating member 21 in the radial direction of the disks 3. Accordingly, the regulating member 21 is displaced between a position separated from the outer peripheral edges of the disks 3 and a contact-possible position or a contacting position.

Although the material of the regulating member 21 is not limited, it is made of, for example, a low-friction member such as an acetal resin (POM), a polyamide resin (such as MC nylon (registered trademark)), or a fluorine resin (such as Teflon (registered trademark)). In addition, the regulating member 21 is not limited to the shape and the side surfaces facing the outer peripheral edges of the disks 3 are curved in a concave shape when seen in a plan view.

In addition, a plurality of (in the embodiment, three) grooves 23 corresponding to the plurality of disks 3 arranged in the axial direction are provided on the side surfaces of the regulating member 21 facing the outer peripheral edges of the disks 3 in the axial direction.

Each groove 23 has a pair of contact surfaces 24a and 24b facing the outer peripheral edges of the corresponding disks 3 and inclined in opposite directions with the outer peripheral edges of the disks 3 interposed therebetween. That is, each of pairs of contact surfaces 24a and 24b corresponding to each of the plurality of disks arranged in the axial direction is arranged on the outer circumferential surface of the regulating member 21 in the axial direction.

The slide driving unit 22 includes, for example, a solenoid, a motor, or the like, and is attached to a side of the regulating member 21 opposite to or facing the outer peripheral edges of the disks 3 via a slide shaft 22a.

In the regulating portion 20, as shown in FIG. 2, normally, the regulating member 21 is positioned away from the outer peripheral edges of the disks 3, and the disks 3 and the regulating member 21 are in a non-contact state. In FIG. 2, while the regulating member 21 is disposed away from the outer peripheral edges of the disks 3 when seen in a plan view, there is no limitation thereto and the disks 3 and the regulating member 21 may not come into contact with each other when the disks 3 rotate in the stationary state.

Meanwhile, in the regulating portion 20, as shown in FIG. 3, when strong external impacts or vibrations are applied, the slide driving unit 22 displaces the regulating member 21 toward the disks 3.

Accordingly, the pair of contact surfaces 24a and 24b (the grooves 23) approach the outer peripheral edges of the disks 3. In addition, here, in the stationary state of the recording and reproducing device 1, the pair of contact surfaces 24a and 24b are separated from each other in the upward/downward direction, and the pair of contact surfaces 24a and 24b are disposed to overlap each other when seen in a plan view.

For this reason, when strong external impacts or vibrations are applied, as the deflection occurs in the disks 3, the outer peripheral edges of the disks 3 come into contact with any one of the pair of contact surfaces 24a and 24b.

Accordingly, while the regulating member 21 in contact with the outer peripheral edges of the disks 3 restricts displacement due to deflection on the disks 3, a contact between the adjacent disks 3 or a contact between the disks 3 and other parts can be avoided. In addition, accordingly, vibrations of the disks 3 can be attenuated faster.

In addition, in the regulating portion 20, as shown in FIG. 4, when strong external impacts or vibrations are applied, the slide driving unit 22 may slide the regulating member 21 to a position where it comes into contact with the outer peripheral edges of the disks 3.

Accordingly, while the regulating member 21 in contact with the outer peripheral edges of the disks 3 restricts displacement due to deflection on the disks 3, a contact between the adjacent disks 3 or a contact between the disks 3 and other parts can be avoided. In addition, accordingly, vibrations of the disks 3 can be attenuated faster.

As described above, in the recording and reproducing device 1 of the embodiment, by providing the above-mentioned regulating portion 20, it is possible to protect the disks 3 from external impacts, vibrations, or the like, and to suppress generation of fragments or dusts due to scraping of parts of the disks 3. In addition, accordingly, vibrations of the disks 3 can be attenuated faster.

Incidentally, if the disks 3 have a large diameter and a small thickness, deflection deformation is likely to occur due to acceleration in the upward/downward direction, and the deformation of the disks 3 increases the vertical movement of the outer peripheral edges. For this reason, in the disks 3 having a large diameter and a small thickness, the effect of protecting the disks 3 in response to external impacts, vibrations, or the like, by the regulating portion 20 described above is increased.

For example, if the disks 3 have a diameter of 90 mm or more and a thickness of 0.55 mm or less, the effect is particularly large, but it is not necessarily limited to this. In addition, the diameter of the disks 3 may be 94 mm or more. In addition, the thickness of the disks 3 may be 0.425 mm or less.

The thickness of the plurality of layers including the magnetic layer formed on the surface of the base material of the disk 3 is generally equal to or smaller than 10% of the thickness of the base material as the sum of the front surface and back surface, but it may be 7.0% or less or may be 5.0% or less. In addition, it is generally 1.0% or more of the thickness of the base material, but it may be 3.0% or more, or 4.0% or more.

The rigidity of the disks 3 is highly dependent on Young's modulus of the base material. When the base material is formed of aluminum alloy, the Young's modulus of the base material is preferably 70 GPa or more, more preferably 73 GPa or more. In addition, the aluminum alloy having the Young's modulus of 75 GPa or more may be used.

In addition, roundness (angle R) is formed between the front surface and the side surface and between the back surface and the side surface on the outer peripheral edges of the disks 3. A radius R of the roundness is not particularly limited, preferably $R \geq 0.10t$, more preferably $R \geq 0.20t$, with respect to a thickness t of the disks 3. In addition, it is preferably $R \leq 0.50t$, more preferably $R \leq 0.40t$, and further preferably $R \leq 0.30t$.

According to this configuration, since an area of the contact portion between the disks 3 and the regulating member 21 is increased and the contact pressure between them is reduced, generation of fragments or dusts from the contact portion is suppressed.

Further, while an angle portion between the front surface and the side surface of the disk 3 and between the back surface and the side surface may be a right angle, it may be chamfered. When it is C-surface chamfering, it is preferably $C \geq 0.10t$, more preferably $C \geq 0.20t$, and further preferably $C \geq 0.30$ t. In addition, when it is C-surface chamfering, it is preferably $C \leq 0.50t$, more preferably $C \leq 0.40t$, and further preferably $C \leq 0.30t$.

Here, when the regulating member 21 is located at a position away from the outer peripheral edges of the disks 3, the shortest distance between the disks 3 and the regulating member 21 in the upward/downward direction is not particularly limited and provided as a distance between the pair of contact surfaces 24a and 24b forming the grooves 23 and the outer peripheral edges of the disks 3 in the upward/downward direction, preferably 100 μm or more, and more preferably 500 μm or more. This is to prevent the disks 3 from frequently coming into contact with the regulating member 21 due to slight disk deformation, slight vibrations, impacts, or the like caused by rotating the disks 3.

In addition, at the position where the regulating member 21 can come into contact with the outer peripheral edges of the disks 3, the distance between the contact surfaces 24a and 24b and the outer peripheral edges of the disks 3 in the upward/downward direction is preferably 100 μm or less, more preferably 50 μm or less, and further preferably 20 μm or less. This is to effectively suppress deformation of the disks 3 in the upward/downward direction. Further, as described above, the pair of contact surfaces 24a and 24b may be in contact with the outer peripheral edges of the disks 3 (i.e. the distance between them is 0 μm).

Further, the present invention is not necessarily limited to the above embodiment, and various modifications may be made without departing from the spirit of the present invention.

Specifically, in the recording and reproducing device 1, the regulating portion 20 may be provided on at least one place in the circumferential direction of the disks 3. Meanwhile, the regulating portion 20 may be provided at a plurality of places in the circumferential direction of the disks 3. Further, when the regulating portion 20 is provided at a plurality of places, the plurality of regulating portions 20 may be arranged in the circumferential direction of the disks 3 at equal intervals. Accordingly, when external impacts, vibrations, or the like, are applied to the disks 3, displacement due to deflection generated in the disks 3 can be restricted in a wider range.

Figure 5:
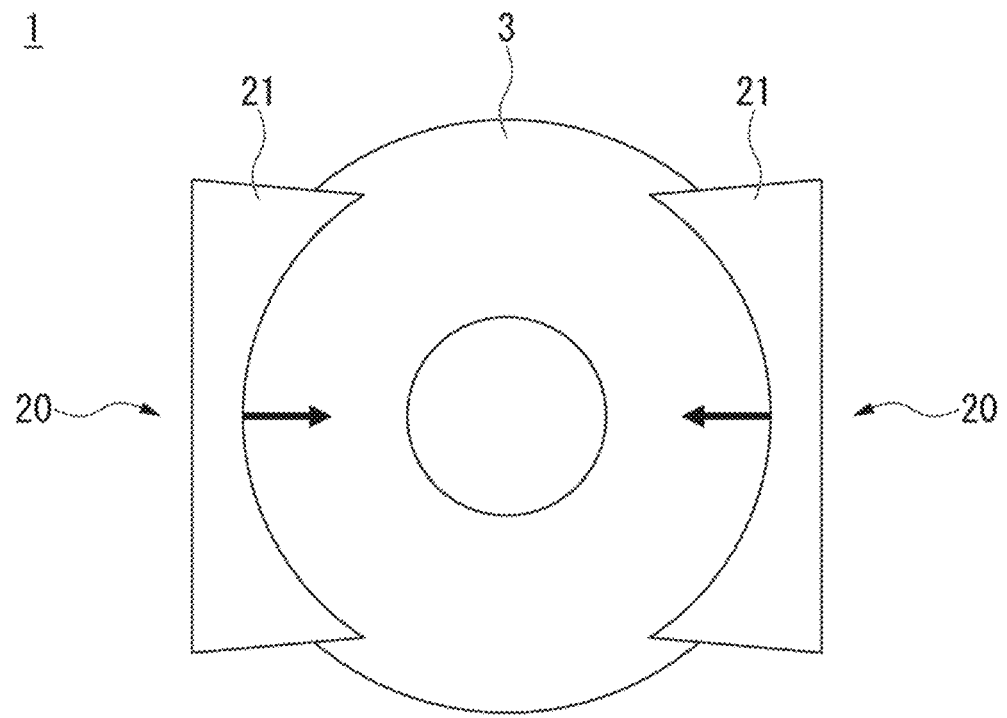
FIG. 5 is a plan view showing a configuration in which regulating portions are provided at a plurality of positions in the recording and reproducing device.

For example, in the recording and reproducing device 1 shown in FIG. 5, the pair of regulating portions 20 are provided on both sides with the disks 3 sandwiched therebetween. In the case of this configuration, when external impacts, vibrations, or the like, are applied to the disks 3, the pair of regulating members 21 approach or come into contact with the outer peripheral edges of the disks 3 to sandwich the outer peripheral edges of the disks 3 from both sides. Further, in the case of the approach, it refers to approaching the regulating member 21 to a position where it can come into contact with the outer peripheral edges of the disks 3 when the external impacts are applied to the disks 3.

Accordingly, vibrations of the disks 3 can be attenuated faster. In addition, it is possible to avoid the contact between the adjacent disks 3 and the contact between the disks 3 and the other parts while restricting displacement due to deflection generated in the disks 3 by the pair of regulating members 21 in contact with the outer peripheral edges of the disks 3.

(First Modification)

Figure 6:
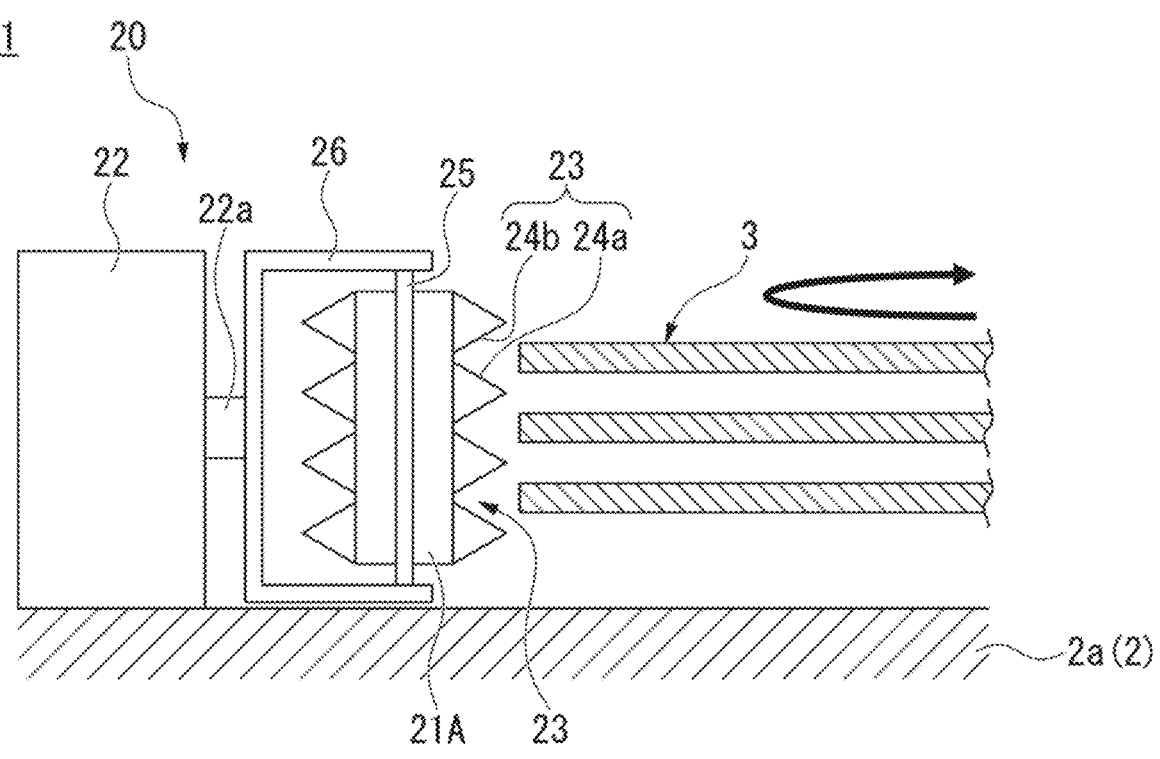
FIG. 6 is a cross-sectional view showing a configuration of a regulating portion shown as a first modification and showing a state in which the regulating member is separated from the outer peripheral edge of the disk.
Figure 7:
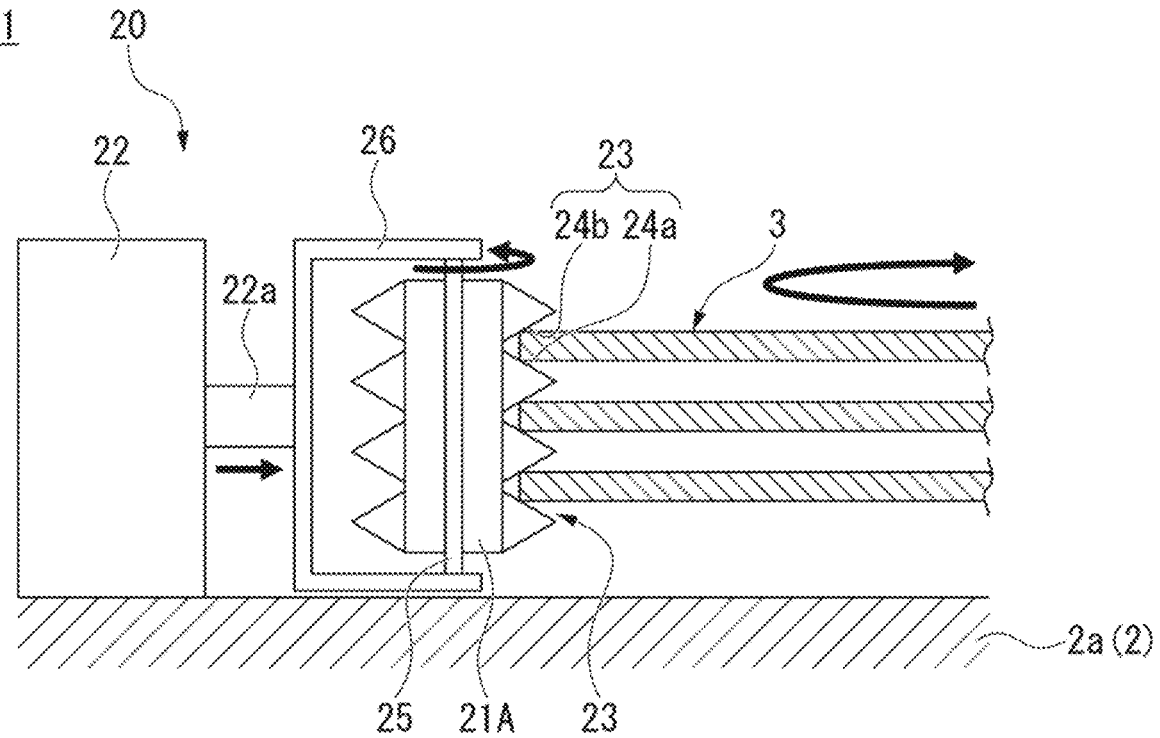
FIG. 7 is a cross-sectional view showing a state in which the regulating member shown in FIG. 6 is moved to a position where it comes into contact with the outer peripheral edge of the disk.

For example, the regulating portion 20 may include a regulating member 21A as shown in FIG. 6 and FIG. 7 as a first modification. Further, FIG. 6 is a cross-sectional view showing a configuration of the regulating portion 20 shown as the first modification and showing a state in which the regulating member 21A is separated from the outer peripheral edges of the disks 3. FIG. 7 is a cross-sectional view showing a state in which the regulating member 21A is moved to a position where is comes into contact with the outer peripheral edges of the disks 3.

The regulating member 21A is formed in the shape of a cylindrical roller, and is provided to be rotatable about an axis parallel to the rotation axis of the disk 3 by being pivotally supported by a support shaft 25 axially penetrating a central portion of the regulating member 21A. In addition, the regulating member 21A is attached to a tip of the slide shaft 22a via a support member 26 that supports both ends of the support shaft 25.

It is preferable to provide lubricity to a sliding portion between the regulating member 21A and the support shaft 25 in order to facilitate rotation of the regulating member 21A. In order to provide lubricity to the sliding portion, for example, at least one of the regulating member 21A and the support shaft 25 is made of a self-lubricating material (see the low-friction member above) or grease or the like is applied to the sliding portion between the regulating member 21A and the support shaft 25. Of these, the former is preferable in that the assembly process is simple and the inside of the case 2 can be less contaminated.

Each of a plurality of (three in the present embodiment) grooves 23 corresponding to each of the plurality of disks arranged in the axial direction is arranged on an outer peripheral surface of the regulating member 21A in the axial direction. The grooves 23 are provided such that they are cut in the outer peripheral surface of the regulating member 21A in the circumferential direction along the entire circumference.

Each groove 23 has a pair of contact surfaces 24a and 24b that face the outer peripheral edge of the corresponding disk 3 and are inclined in opposite directions with the outer peripheral edge of the disk 3 interposed therebetween. That is, each of pairs of contact surfaces 24a and 24b corresponding to each of the plurality of disks arranged in the axial direction is arranged on the outer peripheral surface of the regulating member 21A in the axial direction.

As shown in FIG. 6, the regulating member 21A is normally positioned away from the outer peripheral edges of the disks 3, and the disks 3 and the regulating member 21A of the regulating portion 20 are not in contact with each other.

Meanwhile, in the regulating portion 20, as shown in FIG. 7, when strong external impacts or vibrations are applied, the slide driving unit 22 is displaced to a position where the regulating member 21A can come into contact with or comes into contact with the outer peripheral edges of the disks 3.

At this time, the outer peripheral edge of each rotating disk 3 contacts the groove 23, whereby the regulating member 21A rotates in the opposite direction to the disks 3 while following the rotation of the disks 3.

As a result, the regulating member 21A in contact with the outer peripheral edges of the disks 3 can prevent contact between adjacent disks 3 and contact between the disks 3 and other parts while regulating displacements of the disks 3 due to bending of the disks 3.

Also, when the regulating member 21A comes into contact with the outer peripheral edges of the disks 3, the regulating member 21A rotates following the rotation of the disks 3, whereby it is possible to reduce the generation of debris or dust from the contact portions while reducing the rubbing of the regulating member 21A and the disks 3 against each other, and to attenuate vibrations of the disks 3 faster. It is also possible to suppress a reduction in the rotation speed of the disks 3.

The regulating member 21A in contact with the disks 3 may not rotate if the pressure due to the contact of the outer peripheral edges of the disks 3 with the regulating member 21A is small. In this case, generation of debris or dust from the contact portions is reduced because the friction acting on the contact portions of the disks 3 is small.

When the regulating member 21A in contact with the outer peripheral edges of the disks 3 rotates, a rotation difference may occur between the regulating member 21A and the disks 3. In this case, generation of debris or dust from the contact portions is reduced because the rotation difference is smaller than when the rotating disks 3 contact the stationary regulating member 21A.

(Second Modification)

Figure 8:
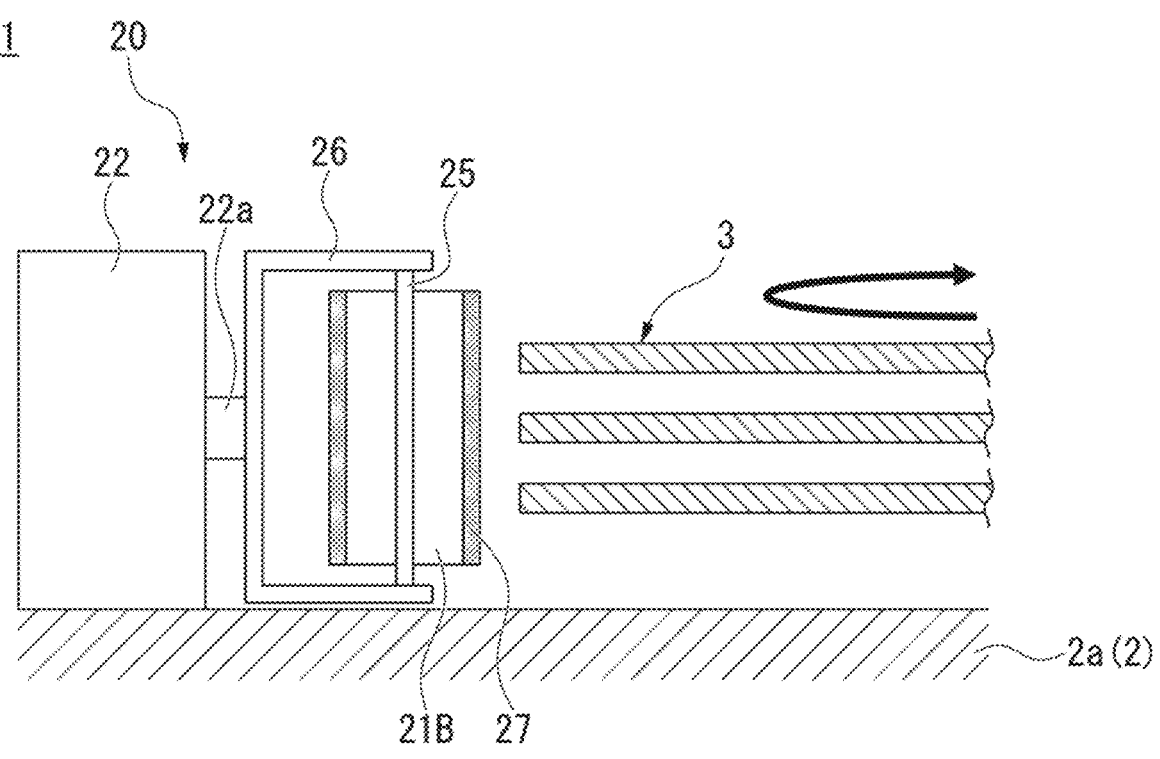
FIG. 8 is a cross-sectional view showing a configuration of a regulating portion shown as a second modification and showing a state in which a regulating member is separated from an outer peripheral edge of a disk.
Figure 9:
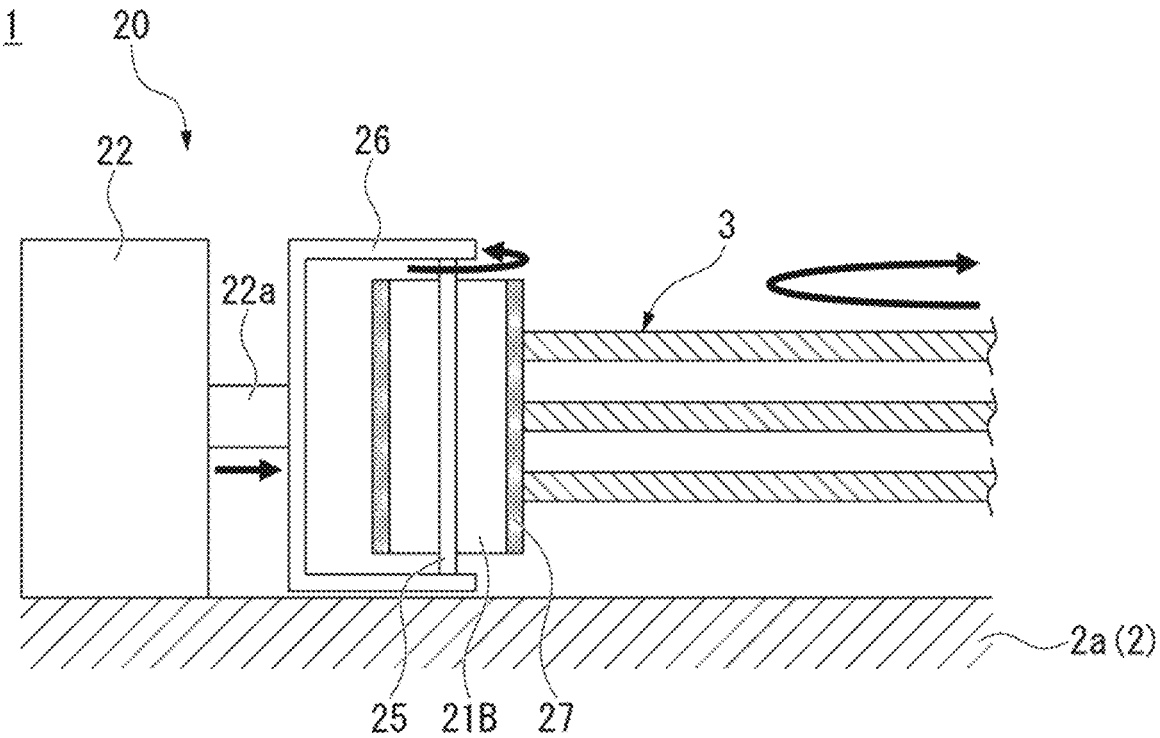
FIG. 9 is a cross-sectional view showing a state in which the regulating member shown in FIG. 8 is moved to a position where it comes into contact with the outer peripheral edge of the disk.

As a second modification, the regulating portion 20 may be configured to include, for example, a regulating member 21B as shown in FIGS. 8 and 9. Further, FIG. 8 is a cross-sectional view showing a configuration of the regulating portion 20 shown as the second modification and showing a state in which the regulating member 21B is separated from the outer peripheral edges of the disks 3. FIG. 9 is a cross-sectional view showing a state in which the regulating member 21B is moved to a position where it comes into contact with the outer peripheral edges of the disks 3.

The regulating member 21B is formed in the shape of a cylindrical roller, and is rotatable around the axis parallel to the rotation axis of the disks 3 by being pivotally supported by the support shaft 25 that passes through its central portion in the axial direction. In addition, the regulating member 21B is attached to the tip of the slide shaft 22a via the support member 26 that supports both ends of the support shaft 25.

In addition, instead of the grooves 23 (the contact surfaces 24a and 24b), a frictional member 27 such as rubber or the like is provided on the outer circumferential surface of the regulating member 21B over the entire circumference. Further, the regulating member 21B itself can also be formed by a frictional member.

In the regulating portion 20, as shown in FIG. 8, normally, the regulating member 21B is positioned away from the outer peripheral edges of the disks 3, and the disks 3 and the regulating member 21B are in a non-contact state.

Meanwhile, in the regulating portion 20, as shown in FIG. 9, when strong external impacts or vibrations are applied, the slide driving unit 22 is displaced to a position where the regulating member 21B comes into contact with the outer peripheral edges of the disks 3.

Here, the regulating member 21B rotates in the direction opposite to the disks 3 while following the rotation of the disks 3 by contacting the outer peripheral edges of the rotating disks 3 with the outer circumferential surface of the regulating member 21B.

In addition, when the regulating member 21B comes into contact with the outer peripheral edges of the disks 3, the regulating member 21B is rotated while following rotation of the disks 3, and vibrations of the disks 3 can be attenuated faster by the frictional force generating between the regulating member 21B and the disks 3 while restricting displacement due to deflection generated in the disks 3.

Accordingly, it is possible to avoid the contact between the adjacent disks 3 and the contact between the disks 3 and the other parts while restricting displacement due to deflection generated in the disks 3 by the regulating member 21B in contact with the outer peripheral edges of the disks 3.

(Third Modification)

Figure 10:
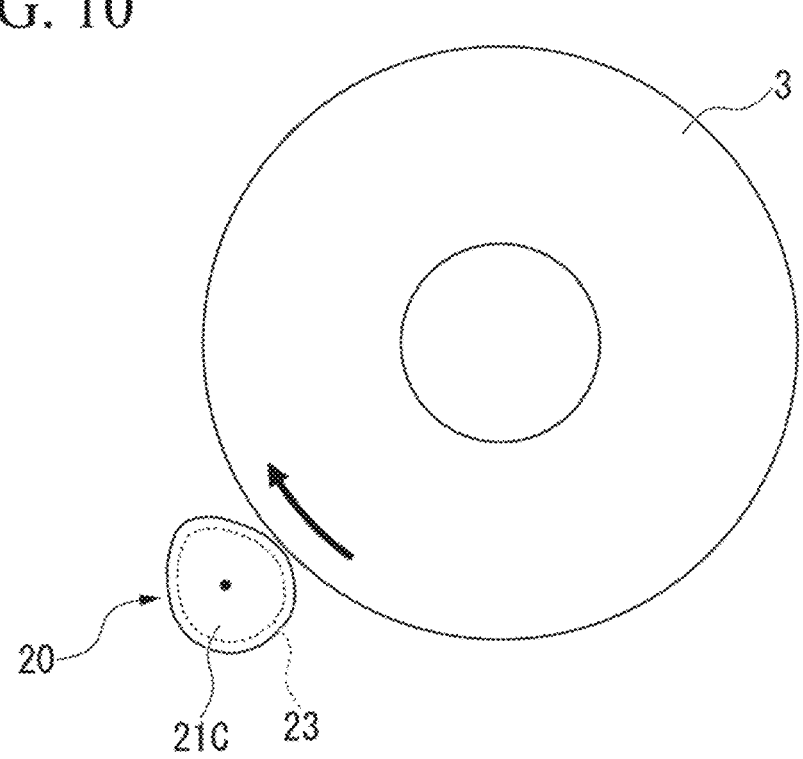
FIG. 10 is a plan view showing a configuration of a regulating portion shown as a third modification and showing a state in which a regulating member is separated from an outer peripheral edge of a disk.
Figure 11:
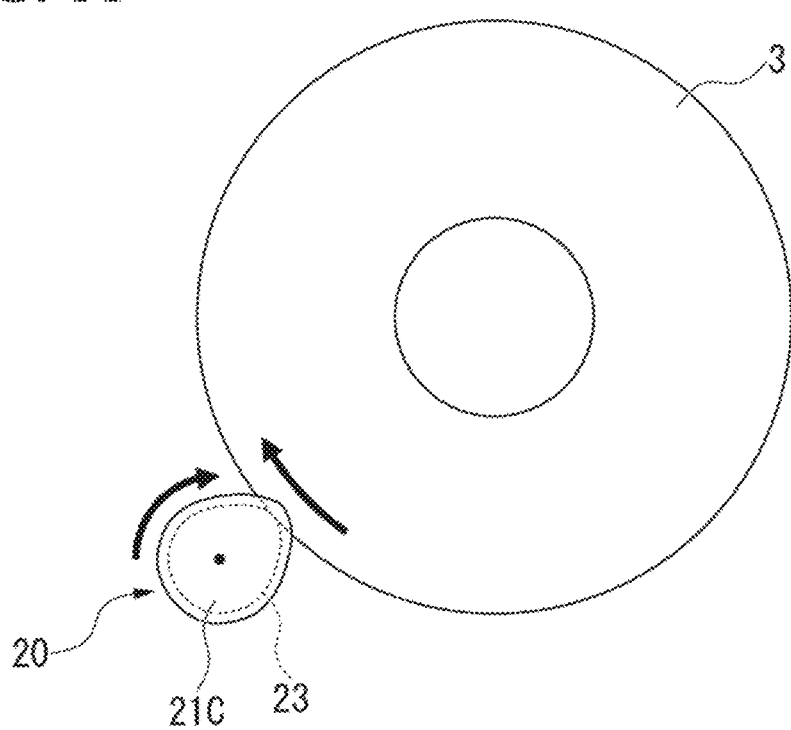
FIG. 11 is a plan view showing a state in which the regulating member shown in FIG. 10 is moved to a position where it comes into contact with the outer peripheral edge of the disk.

As a third modification, the regulating portion 20 may be configured to include, for example, a regulating member 21C as shown in FIGS. 10 and 11. Further, FIG. 10 is a plan view showing a configuration of the regulating portion 20 shown as the third modification and showing a state in which the regulating member 21C is separated from the outer peripheral edges of the disks 3. FIG. 11 is a plan view showing a state in which the regulating member 21C is moved to a position where it approaches or comes into contact with the outer peripheral edges of the disks 3.

In the above-mentioned configuration, by rotating the regulating member 21C around the axis parallel to the rotation axis of the disks 3, the distance between the regulating member 21C and the outer peripheral edges of the disks 3 is changed. More specifically, the regulating member 21C has a cam shape in which the distance from the rotation center changes between a position separated from the outer peripheral edges of the disks 3 and a contact-possible position or a contacting position.

In addition, the grooves 23 (the contact surfaces 24a and 24b) are provided on the outer circumferential surface of the regulating member 21. Meanwhile, the above-mentioned frictional members may be provided on the outer circumferential surface of the regulating member 21 over the entire circumference.

The regulating portion 20 has a pivoting driving unit (not shown) configured to pivot the regulating member 21C around an axis parallel to the rotation axis of the disks 3. The pivoting driving unit includes, for example, a motor or the like, and is pivoted between a position away from the outer peripheral edges of the disks 3 and a contact-possible position or a contacting position.

In the regulating portion 20, as shown in FIG. 10, normally, the regulating member 21C is positioned away from the outer peripheral edges of the disks 3, and the disks 3 and the regulating member 21C are in a non-contact state.

Meanwhile, in the regulating portion 20, as shown in FIG. 11, when strong external impacts or vibrations are applied, a pivoting driving unit (not shown) pivots the regulating member 21C to a position where it can comes into contact with or comes into contact with the outer peripheral edges of the disks 3.

Here, the outer peripheral edges of the disks 3 is positioned between the pair of contact surfaces 24a and 24b (the grooves 23), and when deflection is generated in the disks 3, the outer peripheral edges of the rotating disks 3 approach or come into contact with the grooves 23.

Accordingly, it is possible to avoid the contact between the adjacent disks 3 or the contact between the disks 3 and the other parts while restricting displacement due to deflection generated in the disks 3 by the regulating member 21C in contact with the outer peripheral edges of the disks 3. In addition, accordingly, vibrations of the disks 3 can be attenuated faster.

(Others)

Further, the contact surfaces 24a and 24b are not limited to flat surfaces and may be curved surfaces. The grooves 23 is not necessarily arranged adjacent to each other in the axial direction and may be arranged at intervals in the axial direction.

The regulating members 21A and 21B are not necessarily pivotally supported directly on the support shaft 25 and may be pivotally supported on the support shaft 25 via another member such as a bearing.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A recording and reproducing device comprising:

a case;

at least one recording medium having a disk-shape, a motor configured to rotate the at least one recording medium, a head configured to read or write information from or to the at least one recording medium, and an actuator configured to drive the head to scan in a radial direction of the at least one recording medium which are provided in the case; and a regulating portion configured to, when an external shock is applied to the at least one recording medium, contact an outer peripheral edge of the at least one recording medium to regulate displacements of the at least one recording medium due to bending of the at least one recording medium, wherein the regulating portion has a regulating member and a slide driving unit, wherein the regulating member is displaced between a position away from the outer peripheral edge of the at least one recording medium and a contact-possible position or a contacting position, wherein the slide driving unit slides the regulating member in the radial direction of the at least one recording medium between a position away from the outer peripheral edge of the at least one recording medium and a contact-possible position or a contacting position, wherein the regulating member is pivotally supported on a support shaft parallel to a rotation axis of the at least one recording medium, and rotates following the rotation of the at least one recording medium by coming into contact with the outer peripheral edge of the at least one recording medium.

2. The recording and reproducing device according to claim 1, wherein the slide driving unit is attached to a side of the regulating member opposite to or facing the outer peripheral edges of the at least one recording medium via a slide shaft.

3. The recording and reproducing device according to claim 1, wherein when strong external impacts or vibrations are applied, the slide driving unit is displaced to a position where the regulating member comes into contact with the outer peripheral edges of the at least one recording medium.

* * * * *